United States Patent Office 2,951,739
Patented Sept. 6, 1960

2,951,739

CHROME DYEING OF FIBROUS GLASS MATERIAL

William T. Roff, Jr., Tryon, N.C., assignor to J. P. Stevens & Co., Inc., New York, N.Y., a corporation of Delaware No Drawing. Filed May 20, 1958, Ser. No. 736,453

11 Claims. (Cl. 8—8)

This invention relates to a process for dyeing fibrous glass material.

Fibrous glass is being used extensively for the manufacture of textile fabrics. For this purpose, it is necessary that the fibrous glass fabric be offered in various colors for its acceptance as a substitute for other kinds of fabrics. Conventionally, fabrics are dyed by one or more techniques. The types of dye and process to be used are determined from the nature of the fabric. For example, chrome dyes or chromium mordant dyes are used for proteinaceous fibers such as wool. Any attempt to dye fibrous glass fabric with a chrome dye has resulted in failure, because as one would expect, fibrous glass material is not proteinaceous in character, nor does it possess characteristics which make direct dyeing possible. The chrome dyes include a large number of dyes, and it would be advantageous to use them, if it could be made possible through an intermediate or coupling agent. Knowledge relating to dyeing of fibrous glass fabric is too meagre to permit any generalizations as to the kind of coupling agents which could be used for the purpose. Only after extensive investigation was it possible to derive a satisfactory scheme for exploiting chrome dyes in coloring fibrous glass fabric.

Therefore, an object of this invention is to provide a novel method of dyeing fibrous glass material.

Other objects and advantages will become apparent from the following description and explanation thereof.

The process of this invention is concerned with reacting a fibrous glass material with a Werner type of compound of an alpha-beta unsaturated acrylato chromic chloride and dyeing the resultant product with a chrome dye. The acrylato chromic chloride has a single carboxyl group and attached to it is the unsaturated chain containing about 2 to 6 carbon atoms. In turn, the carboxyl group is bonded by covalence and coordination to two nuclear trivalent chromium atoms, and, the chromium atoms are bonded by covalence and coordination to a single group selected from the group consisting of aquo groups, hydroxyl and monovalent negative groups which are anions of monobasic acids. The acrylato chromic chloride can be represented by the following structural formula:

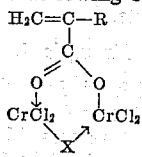

wherein X is hydroxyl, aquo groups ($H_2O$), and monovalent negative groups which are anions of monobasic acids and R is hydrogen or an alkyl substituent containing 1 to 7 carbon atoms. It is preferred to use the acrylato chromic chloride in which X is a hydroxyl group and R is a methyl group. Examples of the monovalent groups are chloro, bromo, formato, acetato, nitrato, etc. The unsaturated carboxylic acids group may contain not more than 10 carbon atoms, and may comprise groups from such acids as acrylic acid and substituted acrylic acids such as crotonic, isocrotonic, alpha and beta ethyl acrylic, angelic, etc. acids, designated hereinafter generically as acrylic acids.

Prior to reacting acrylato chromic chloride with fibrous glass material, it should be ascertained whether the surface of the glass is free of carbonaceous contaminants. Ordinarily, a binder such as starch and a lubricant such as hydrogenated vegetable oil are used to tie together the glass monofilaments into a fiber. These contaminants can be removed by heating processes, known to those skilled in this art as the "batch process" and the "coronizing process." In the "batch process" the fibrous glass material is heated initially to 350° F. and thereafter the temperature is raised to 650° F. over a period of 65 hours. The "coronizing process" involves subjecting the fibrous glass material to a temperature of 1150°–1400° F. for 8 to 10 seconds. The "coronizing process" is preferred for this purpose, because it is far more economical than the "batch process."

In the next step of the operation, the fibrous glass material is reacted with acrylato chromic chloride. The concentration of acrylato chromic chloride which is employed in the reaction will depend upon the depth of color being sought. For example, if a pastel shade is desired, the concentration of acrylato chromic chloride is about 0.5 to 6 lbs. of acrylato chromic chloride per 50 gallons of aqueous medium. The chloride is not water soluble, and so it is necessary that it be first dissolved in a solvent such as isopropanol and then added to water. The ways in which the chloride can be solubilized in water are well known to those skilled in the art. For deeper shades, the concentration of chloride is greater; for example, it can be as high as 15 lbs. per 50 gallons of aqueous medium. The pH of the chloride solution is about 3.4 to 6.5, preferably about 5 to 6.5. It is usually required that an alkaline reagent, such as ammonia, or a substituted ammonium compound be added for adjustment of pH to within the range indicated.

The fibrous glass material is dipped or submerged into the chloride solution long enough to be wetted. To facilitate wetting, the bath temperature is held at about 70° to 100° F. It may take about 5 to 10 seconds for the glass material to be wetted. The temperature and time may be varied above and below these ranges, depending upon the style of fabric and the concentration of chloride in the bath. After the fibrous glass is wetted, it is wrung or squeezed by suitable means to reduce the chloride solution content to about 30 to 60% by weight, based on the fibrous glass material. If desired, the wringing operation may be eliminated. Following the squeezing or wringing operation, fibrous glass is heated to a temperature of about 225° to 375° F. and for a period of about 3 to 8 minutes. The selection of time and temperature is based upon the style of fibrous material, the nature of the heating equipment, etc. During the curing treatment, volatile substances are driven off, and the chromium reacts with the glass. The fibrous glass is a siliceous material. It can contain other elements or compounds combined with it. For example, a silicoborate glass is widely used for the manufacture of fabrics. The nature of the reaction with the chromium can be illustrated by the following structural formula:

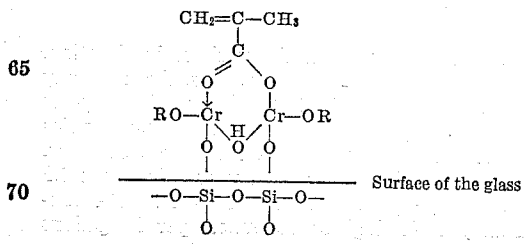

In the above formula "R" represents an alkyl group. It will be noted that the trivalent chromium atoms became attached to oxygen atoms through hydrolysis of the chlorine atoms, and one of the oxygen atoms is attached to the silicon atom of the glass. It will be found that the cured or treated fibrous glass material contains an impurity, a halogen compound, which is ammonium chloride when ammonium hydroxide is employed to raise the pH of the chloride solution. If the treated glass is to be dyed by a continuous process, the halogen compound will accumulate in the dye bath, and so it is preferred that it be removed by washing the treated glass with water. The washed glass material is dried by conventional means.

The treated or cured fibrous glass material, with or without washing, is dyed with a chrome dye. The following examples serve to illustrate the nature of these dyes; however, it should be understood that all of the chrome dyes which are known to those skilled in the art can be employed.

(1) Azo dye with an O-hydroxy carboxy structure, e.g., Alizarin yellow R, CI 40

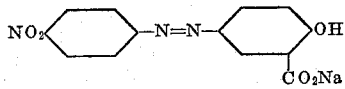

(2) Azo dye with peri dihydroxy structure, e.g., chromatrope 2R, CI 29

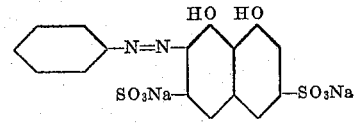

(3) Azo dye with O-carboxy-$O^1$-hydroxy structure, e.g., acid alizarin red B, CI 216

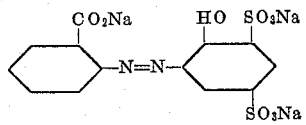

(4) Azo dye with O-amino-$O^1$-hydroxy structure, e.g., anthracene chrome Violet B, CI 169

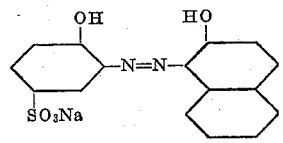

(5) Azo dye with O, $O^1$ dihydroxy structure, e.g., chromatrope FB, CI 179

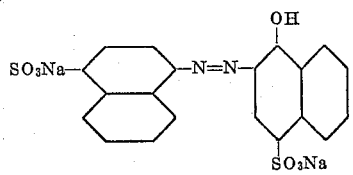

(6) Nitroso dye with an $O^1$ hydroxy structure, e.g., naphthol green B

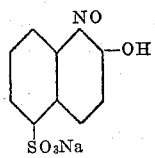

The dyeing operation is relatively short in duration, requiring about 2 to 5 minutes. However, the time may be longer or shorter than just mentioned. The dye is dissolved in water to provide a concentration which varies in accordance with the desired shade or depth of color. For a pastel shade, the dye bath may contain about 0.5 to 8 ounces of dye per 50 gallons of water. The concentration may be as high as 16 ounces per 50 gallons of water. At the outset, the treated cloth is passed into the bath which is held at about 120° to 160° F. As the temperature increases there is a greater tendency for the dye to agglomerate on the surface of the treated glass material and thus interfere with dye coupling. The temperature is maintained at 120°–160° F. for at least about 30 seconds and it can be for as long as 5 minutes. In the next step, the temperature is raised to 160°–212° F. and held at that level for an additional 2 to 5 minutes. When the temperature is at least 180° F., and preferably at least about 200° F., a weak acid can be added to the bath containing the fibrous glass material. The glass material must be present in the dye bath when the acid is added, otherwise the dye may precipitate from solution. The weak acid is one having a dissociation constant which is lower than about $1 \times 10^{-2}$. Specific examples are acetic acid, formic acid, propionic acid, etc. The presence of the weak acid facilitates coupling of the dye to the treated glass material, resulting in shorter dyeing time and better fastness of color.

To provide a fuller understanding of the present invention, reference will be had to the following examples:

*Example 1*

A piece of bulked yarn drapery fibrous glass cloth was padded in a bath containing methacrylato chromic chloride of the Werner type in a concentration of 9 lbs. of chloride per 50 gallons of aqueous media. The pH of the solution was raised to 6.0 by the addition of ammonium hydroxide. The bath temperature was at ambient level. The wet cloth was then cured at 325° F. for 5 minutes. The dry treated cloth was placed in a dye bath containing two grams of Alizarol Azurine ECA per liter of water. The temperature of the dye bath was 160° F. With the cloth in the dye bath, the temperature was raised to the boiling point in 5 minutes. Then the bath containing the cloth was boiled for an additional 2 minutes, the cloth removed, washed in water and dried at 220° F.

*Example 2*

The dry treated cloth of Example 1 was placed in a dye bath containing 2 gms. of Alizarol Yellow 2 GN per liter of water. Dye bath temperature was 160° F. The temperature raised to approximately 180° F. and then 2 cubic centimeters of acetic acid 84% were added slowly dropwise. The dye bath was brought to a boil in about 1 minute and held there for 5 minutes. The cloth was removed, rinsed and dried in laboratory oven at 220° F. for 1 minute.

*Example 3*

The dry treated cloth of Example 1 was placed in a dye bath containing 2 gms./L Alizarol Flavine RA conc. 125%. The dye bath temperature was 160° F. The temperature was raised to approximately 180° F. and then 0.5 cc. of acetic acid 84% were added slowly dropwise. The temperature was further increased to boiling in about 1 minute, and held there for 5 minutes. The cloth was removed, rinsed and dried in a laboratory oven at 220° F. for 1 minute.

*Example 4*

The dry treated cloth of Example 1 was placed in a dye bath containing 2 gms./l. of Alizarol Orange ML. The dye bath temperature was 160° F. The temperature was raised to approximately 180° F. and then 0.2 cc. of acetic acid 84% were added slowly dropwise. The temperature was further increased to boiling in about 1 minute, and held there for 5 minutes. The cloth was removed, rinsed and dried in laboratory oven at 220° F. for 1 minute.

Having thus provided a description of my invention along with specific examples thereof, it should be understood that the invention is defined by the appended claims.

I claim:

1. A process which comprises reacting fibrous glass material with an acrylato chromic chloride complex of the Werner type and dyeing the resultant product with a chrome dye.

2. A process which comprises wetting a fibrous glass material with an aqueous bath containing acrylato chromic chloride complex of the Werner type and having a pH of about 3.4 to 6.5 so that the glass material contains about 30 to 60% by weight of bath liquor, curing the wetted glass material at a temperature of about 225° to 375° F., for a period of about 3 to 8 minutes, and passing the cured glass material into a dye bath containing a chrome dye.

3. The process of claim 2 being further characterized by first maintaining the dye bath at about 120° to 160° F., for not less than about 30 seconds, further dyeing the cured material in a dye bath at a temperature of about 160° to 212° F. and for about 2 to 5 minutes.

4. The process of claim 2 being further characterized by wetting the glass material at a temperature of about 70° to 100° F.

5. The process of claim 2 being further characterized by adding a weak acid to the dye bath after the temperature is at least about 180° F.

6. The process of claim 1 wherein the acrylato chromic chloride is methacrylato chromic chloride.

7. A process which comprises reacting fibrous glass material with methacrylato chromic chloride complex of the Werner type and dyeing the resultant product with a chrome dye.

8. A process which comprises wetting a fibrous glass material with an aqueous bath containing methacrylato chromic chloride complex of the Werner type and having a pH of about 3.4 to 6.5 so that the glass material contains about 30 to 60% by weight of bath liquor, curing the wetted glass material at a temperature of about 225° to 375° F., for a period of about 3 to 8 minutes, and passing the cured glass material into a dye bath containing a chrome dye.

9. The process of claim 8 being further characterized by first maintaining the dye bath at about 120° to 160° F. for not less than about 30 seconds, further dyeing the cured material in a dye bath at a temperature of about 160° to 212° F. and for about 2 to 5 minutes.

10. The process of claim 8 being further characterized by wetting the glass material at a temperature of about 70° to 100° F.

11. The process of claim 8 being further characterized by adding a weak acid to the dye bath after the temperature is at least about 180° F.

References Cited in the file of this patent

UNITED STATES PATENTS

| | | |
|---|---|---|
| 2,593,818 | Waggoner | Apr. 22, 1952 |
| 2,700,010 | Baltz | Jan. 18, 1955 |
| 2,744,835 | Caroselli | May 8, 1956 |
| 2,825,659 | Dalton | Mar. 4, 1958 |

FOREIGN PATENTS

| | | |
|---|---|---|
| 522,743 | Canada | Mar. 13, 1956 |